US011237332B1

(12) United States Patent
Hajati et al.

(10) Patent No.: US 11,237,332 B1
(45) Date of Patent: Feb. 1, 2022

(54) DIRECT OPTICAL COUPLING OF SCANNING LIGHT ENGINES TO A WAVEGUIDE

(71) Applicant: Apple Inc., Cupertino, CA (US)

(72) Inventors: Arman Hajati, San Mateo, CA (US); Robert S. Upton, Mountain View, CA (US); Yuval Gerson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/871,068

(22) Filed: May 11, 2020

Related U.S. Application Data

(60) Provisional application No. 62/847,974, filed on May 15, 2019.

(51) Int. Cl.
*G02B 6/26* (2006.01)
*G02B 6/42* (2006.01)
*G02B 6/00* (2006.01)

(52) U.S. Cl.
CPC ............. *G02B 6/26* (2013.01); *G02B 6/4259* (2013.01); *G02B 2006/0098* (2013.01)

(58) Field of Classification Search
CPC . G02B 6/26; G02B 6/4259; G02B 2006/0098
See application file for complete search history.

(56) References Cited

U.S. PATENT DOCUMENTS

| | | | |
|---|---|---|---|
| 8,237,760 B2 | 8/2012 | Nihei et al. | |
| 8,976,363 B2 | 3/2015 | Bendall et al. | |
| 9,025,253 B2 * | 5/2015 | Hadad | G02B 6/00 359/633 |
| 9,297,996 B2 | 3/2016 | Bohn et al. | |
| 9,329,080 B2 | 5/2016 | Shpunt et al. | |
| 10,003,168 B1 | 6/2018 | Villeneuve | |
| 10,488,746 B2 | 11/2019 | Pertierra et al. | |
| 2003/0011751 A1 | 1/2003 | Sakata et al. | |

(Continued)

FOREIGN PATENT DOCUMENTS

EP   3550329 A1   10/2019

OTHER PUBLICATIONS

Hajati et al., U.S. Appl. No. 16/871,069, filed May 11, 2020.
Hajati et al., U.S. Appl. No. 16/871,063, filed May 11, 2020.
U.S. Appl. No. 17/134,569 Office Action dated Sep. 20, 2021.

*Primary Examiner* — Sung H Pak
(74) *Attorney, Agent, or Firm* — Kligler & Associates Patent Attorneys Ltd

(57) ABSTRACT

An optical apparatus includes an optically transparent slab waveguide including first and second, mutually-parallel planar faces and an edge non-parallel to the planar faces. A radiation source directs a beam of optical radiation to enter the waveguide through the first planar face at an entrance location and entrance angle selected so that the beam subsequently exits the waveguide at an exit location in a surface selected from among the second planar face and the edge. A scanning mirror is positioned to receive the beam that has exited through the surface and to reflect the beam back through the surface into the waveguide while the scanning mirror rotates about an axis parallel to the surface over a range of angles selected so as to cause the beam, after reflection back into the waveguide through the surface, to propagate within the waveguide by total internal reflection (TIR).

18 Claims, 5 Drawing Sheets

(56) References Cited

U.S. PATENT DOCUMENTS

| | | |
|---|---|---|
| 2006/0221022 A1 | 10/2006 | Hajjar |
| 2007/0153866 A1 | 7/2007 | Shchegrov et al. |
| 2007/0159673 A1* | 7/2007 | Freeman .............. G02B 27/145 |
| | | 359/19 |
| 2014/0146394 A1 | 5/2014 | Tout et al. |
| 2017/0176596 A1 | 6/2017 | Shpunt et al. |
| 2018/0081168 A1 | 3/2018 | Shpunt et al. |
| 2018/0120559 A1 | 5/2018 | Yeoh et al. |
| 2019/0094981 A1 | 3/2019 | Bradski et al. |
| 2019/0227319 A1 | 7/2019 | Trail et al. |
| 2019/0348585 A1 | 11/2019 | Woodgate et al. |

* cited by examiner

DIRECT OPTICAL COUPLING OF SCANNING LIGHT ENGINES TO A WAVEGUIDE

CROSS-REFERENCE TO RELATED APPLICATION

This application claims the benefit of U.S. Provisional Patent Application 62/847,974, filed May 15, 2019, which is incorporated herein by reference.

FIELD OF THE INVENTION

The present invention relates generally to methods and devices for projection of optical radiation, and particularly to compact optical scanners.

BACKGROUND

Scanning light engines are used for generating images in various display apparatuses, which project electronically generated images either onto a screen or directly into the eye of an observer. Waveguides are used as one alternative for conveying the generated images from the light engine to a display or directly into the eye of an observer in augmented reality (AR) and virtual reality (VR) systems.

SUMMARY

Embodiments of the present invention that are described herein provide improved apparatus and methods for optical scanning and projection.

There is therefore provided, in accordance with an embodiment of the invention, an optical apparatus, including an optically transparent slab waveguide including first and second, mutually-parallel planar faces and an edge non-parallel to the planar faces. A radiation source is configured to direct a beam of optical radiation to enter the waveguide through the first planar face at an entrance location and entrance angle selected so that the beam subsequently exits the waveguide at an exit location in a surface selected from among a group of surfaces consisting of the second planar face and the edge. A scanning mirror is positioned to receive the beam that has exited through the surface and to reflect the beam back through the surface into the waveguide while the scanning mirror rotates about an axis parallel to the surface over a range of angles selected so as to cause the beam, after reflection back into the waveguide through the surface, to propagate within the waveguide by total internal reflection (TIR) between the first and second planar faces.

In the disclosed embodiments, the beam exits the surface at a selected exit angle relative to the surface, and the range of angles over which the scanning mirror rotates is selected so as to cause the beam reflected back from the scanning mirror to enter the surface and impinge on the first planar face at angles exceeding a critical angle for TIR within the waveguide.

In some embodiments, the apparatus includes an optically transparent prism including first and second, mutually non-parallel planar prism faces and positioned between the radiation source and the slab waveguide so that the beam from the radiation source enters the prism through the second prism face and exits from the prism through the first prism face so as to enter the waveguide through the first planar face at the entrance location and entrance angle such that the beam subsequently exits the waveguide at the exit location. Additionally or alternatively, the waveguide includes an out-coupler configured to intercept the beam that propagates within the waveguide by total internal reflection and to couple the beam out of the waveguide. In a disclosed embodiment, the scanning mirror rotates over a range of angles exceeding 50°.

In some embodiments, the surface through which the beam exits the waveguide at the exit location is the edge of the waveguide, and wherein the edge is planar and non-normal to the planar faces of the waveguide. In these embodiments, the scanning mirror is typically positioned in proximity to and parallel to the planar edge.

Alternatively, the surface through which the beam exits the waveguide at the exit location is the second planar face of the waveguide, and the apparatus includes an optically transparent prism, which includes first and second, mutually non-parallel planar prism faces and is positioned with the first prism face in proximity to the exit location in the second planar face of the waveguide and the second prism face in proximity to the scanning mirror. In a disclosed embodiment, the prism is positioned so that the beam exiting the waveguide at the exit location enters the prism through the first prism face and exits the prism through the second prism face to impinge on the scanning mirror, which reflects the beam back through the second prism face so that the reflected beam exits the prism through the first prism face and reenters the waveguide through the second planar face at an angle exceeding a critical angle for TIR within the waveguide.

In some embodiments, the radiation source includes an array of emitters and projection optics configured to collect the optical radiation from the emitters and to direct the optical radiation toward the entrance location.

There is also provided, in accordance with an embodiment of the invention, a method for optical scanning, which includes directing a beam of optical radiation to enter an optically transparent slab waveguide, which includes first and second, mutually-parallel planar faces and an edge non-parallel to the planar faces, through the first planar face at an entrance location and entrance angle selected so that the beam subsequently exits the waveguide at an exit location in a surface selected from among a group of surfaces consisting of the second planar face and the edge. A scanning mirror is positioned to receive the beam that has exited through the surface and to reflect the beam back through the surface into the waveguide. The scanning mirror rotates about an axis parallel to the surface over a range of angles selected so as to cause the beam, after reflection back into the waveguide through the surface, to propagate within the waveguide by total internal reflection (TIR) between the first and second planar faces.

The present invention will be more fully understood from the following detailed description of the embodiments thereof, taken together with the drawings in which:

DETAILED DESCRIPTION OF EMBODIMENTS

Overview

Figure 1:
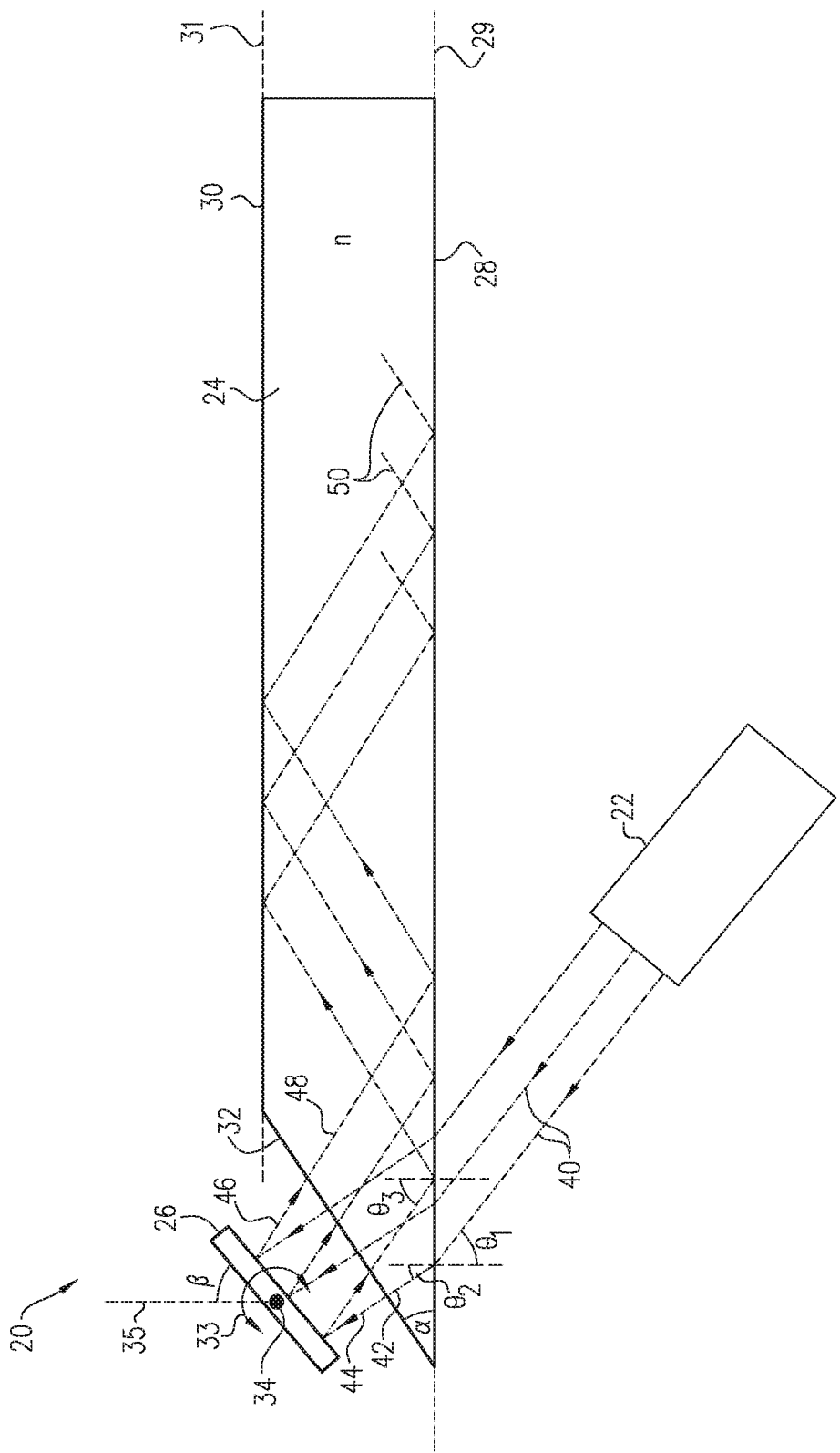
FIG. 1 is a schematic sectional view of an optical apparatus, in accordance with an embodiment of the invention.

A number of current applications, for example VR and AR systems, require coupling light from a scanning light engine into a waveguide. There is a need for compact coupling solutions that provide efficient optical coupling over a wide angular field. The embodiments of the present invention that are described herein address this need by means of a wedge-shaped edge of the waveguide, with a small scanning mirror in close proximity to the wedge-shaped edge.

In the disclosed embodiments, optical apparatus comprises an optically transparent slab waveguide with mutually-parallel planar faces that define first and second planes. These faces can be used to provide a light containment volume that allows light to propagate down the waveguide. In some embodiments, a planar edge of the slab waveguide, which is contained between the first and second planes, is shaped to form a wedge between these planes. In other words, the planar edge is not normal to the planar faces, meaning that one angle between the edge and one of the planes is acute, and the other angle between the edge and the other plane is obtuse. For purposes of the present description, the "first plane" and "second plane" are designated such that the angle between the edge and the first plane is acute, and the angle between the edge and the second plane is obtuse. The acute angle can conveniently be 45°, but other angles may alternatively be used, based on optimal light coupling efficiency. In an alternative embodiment, the wedge is provided by an additional prism in proximity to the second planar face of the waveguide.

A source of radiation directs a beam of optical radiation so that it enters the waveguide through the first planar face at an entrance location, which is typically near the edge. (The terms "optical radiation," "radiation," and "light" as used in the present description and in the claims refer generally to any and all of visible, infrared, and ultraviolet radiation.) The angle of incidence and the location of the beam on the first plane are chosen so that, after refraction within the waveguide, the beam exits the waveguide through an exit location in another surface of the waveguide, which may be either the edge or the second planar face.

The scanning mirror is positioned adjacent to and facing this other surface, so that it receives the beam that exits the waveguide. The scanning mirror rotates about an axis that is parallel to the surface (either the edge or the second planar face), with sufficient space between the scanning mirror and the surface to prevent the scanning mirror from striking the edge during its rotation. The range of the rotational angles of the scanning mirror is determined so that the reflected beam re-enters the waveguide through the surface, and then impinges on the first planar face at angles exceeding a critical angle for total internal reflection (TIR) within the waveguide. The range of angles of incidence is chosen so that once the beam has re-entered the waveguide, it is "trapped" between the first and second planar faces due to TIR. The light will then propagate inside the waveguide by repeated TIRs, until it encounters a structure in the waveguide that modifies its propagation vector. This modification can be enabled by an out-coupling structure.

The range of the rotational angles of the scanning mirror is used to enable different propagation angles for the beam inside the waveguide, and thus enable different angular directions for the beam after it is, for example, coupled out of the waveguide.

Scanning Via the Edge of the Waveguide

FIG. 1 is a schematic sectional view of an optical apparatus 20, in accordance with an embodiment of the invention.

Optical apparatus 20 comprises a source of radiation 22, a slab waveguide 24, and a scanning mirror 26. Slab waveguide 24 comprises an optically transparent material, such as glass, with a refractive index n, having a first planar face 28 and a second planar face 30. First and second planar faces 28 and 30 define respective first and second planes 29 and 31. A planar edge 32 is contained between first plane 29 and second plane 31, and it is shaped to form a wedge between these planes, i.e., the planar edge is not normal to the first and second planes. Edge 32 forms an acute wedge angle α with first plane 29. In the pictured example, α=45°, although other values for a may alternatively be used.

Scanning mirror 26 rotates about an axis 34, which is parallel to edge 32, with rotational motion as shown by an arrow 33. The angle of rotation of scanning mirror 26 is denoted by β, wherein angle β is measured from a fixed (but arbitrarily chosen) reference line 35. Although axis 34 is shown in the figure to be contained within scanning mirror 26, the axis may alternatively be positioned outside the mirror. Scanning mirror 26 is positioned at a distance from edge 32 that enables the mirror, on the one hand, to receive beams of radiation exiting from the edge, and, on the other hand, to rotate freely over a required angular range of rotation without striking the waveguide. This feature is detailed below.

Source 22 emits one or more beams of radiation, shown by rays 40. In one embodiment, for example, source 22 is part of a light engine, which emits an array of visible light beams that are modulated temporally, spatially and possibly spectrally to create an image, which is projected through waveguide 24. (Various sorts of light engines may be used for this purpose; and details of the light engine are beyond the scope of the present description.) Rays 40 impinge on first planar face 28 at an angle of incidence $\theta_1$, and refract into waveguide 24 into rays 42 at an angle $\theta_2$. Angle $\theta_2$ is determined by Snell's law: $n \times \sin(\theta_2) = \sin(\theta_1)$, wherein n is the refractive index of waveguide 24, and the refractive index of the incident medium (air) is taken to be 1.

Rays 42 impinge on edge 32 and exit from waveguide 24 as rays 44 after refraction at the edge. It is advantageous to select wedge angle α so as to minimize the refraction (change in the direction) at edge 32. Rays 44 are reflected by scanning mirror 26 into rays 46, which impinge on edge 32, re-enter waveguide 24 as rays 48, and impinge on first planar face 28 at an angle incidence of $\theta_3$. For simplicity of illustration, the angles of incidence and the refraction of rays 42 and 46 at edge 32 are not shown in the figure.

Angle of incidence $\theta_1$, wedge angle α, and the range of rotation angles β are chosen so that the angle of incidence $\theta_3$ exceeds the critical angle $\theta_c$, given by $\sin(\theta_c) = 1/n$, over the entire range β. The critical angle gives the limiting angle of incidence for TIR, i.e., any ray incident from inside waveguide 24 on first or second planar face 28 or 30 at an angle of incidence exceeding the critical angle $\theta_c$ is totally internally reflected back into the waveguide. Specifically, the requirement for rotation angles β is such that the respective entrance angles of rays 46 (angles of incidence of rays 46 at edge 32) exceed the respective exit angles of rays 44 (angles of incidence of rays 44 at edge 32) by a sufficient amount so that angle $\theta_3$ exceeds the critical angle $\theta_c$. When source 22 emits a non-collimated beam, i.e., rays 40 are not mutually parallel, each ray 40 will impinge first on planar face 28 at a different angle of incidence $\theta_1$, and the condition for all angles $\theta_1$, wedge angle $\alpha$, and rotation angles $\beta$ is that all resulting angles of incidence $\theta_3$ exceed the critical angle $\theta_c$. Thus a non-collimated beam emitted by source 22 will limit the range of rotation angles $\beta$ to a smaller range than that for a collimated beam.

The beam defined by rays 48 continues to propagate within waveguide 24 by TIR between first and second planar faces 28 and 30, as indicated by dotted lines 50, until it encounters a structure (not shown in this figure) in the waveguide that modifies its propagation, such as, for example, an out-coupler.

It is desirable for some applications of optical apparatus 20, for example in a VR system, to maximize the angular range of rays 48. As the critical angle $\theta_c$ decreases with increasing refractive index n, it is advantageous for waveguide 24 to comprise glass or another suitable transparent material with a high refractive index, for example 1.6, 1.7, or 1.8. Similarly, it is advantageous to choose angle $\theta_1$ so that angle $\theta_2$ is as close as practical to the critical angle $\theta_c$, as this will enable scanning mirror 26 to scan from a near-normal incidence to rays 44. Using the above design guidelines, waveguide 24 is capable of supporting a wide angular range, even in excess of 50°, for rays extracted by an out-coupler from waveguide 24, meaning that mirror 26 may similarly be made to scan over a range of angles exceeding 50°.

Figure 2:
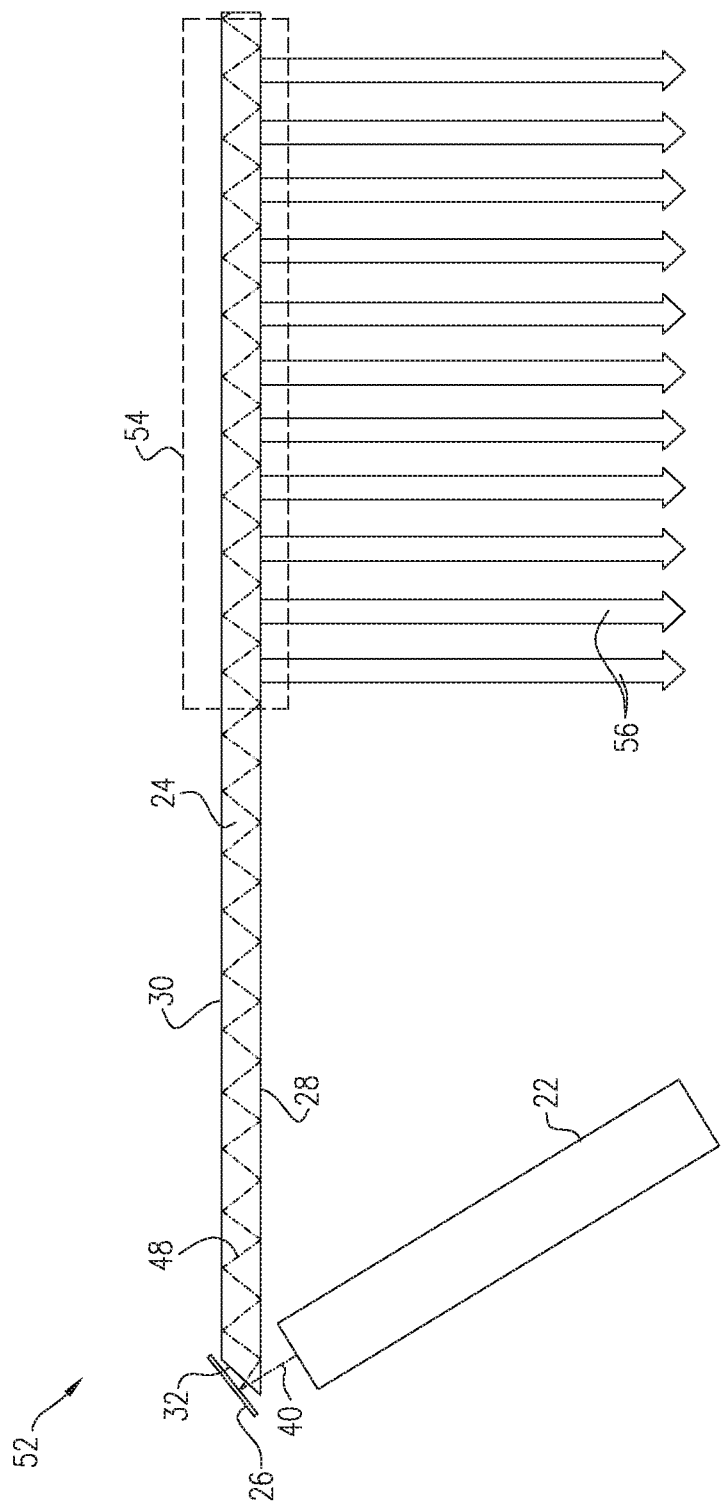
FIG. 2 is a schematic sectional view of an optical apparatus, in accordance with another embodiment of the invention.

FIG. 2 is a schematic sectional view of an optical apparatus 52, in accordance with another embodiment of the invention. Optical apparatus 52 is similar to optical apparatus 20, with the addition of an out-coupler 54. Out-coupler 54 is configured to couple out of waveguide 24 a portion of rays 48 that reach the out-coupler. Out-coupler comprises, for example, a thick volume hologram. Alternatively, out-coupler 54 may comprise a thin volume hologram, a surface grating, or partially-reflective surfaces.

Rays 40 emitted by source 22 propagate, as in FIG. 1, through first planar face 28 and edge 32 to scanning mirror 26 and back into waveguide 24 into rays 48. Rays 48 propagate inside waveguide 24 by TIR until they reach out-coupler 54, and are then coupled out of waveguide 24 as rays 56. The coupling may take place gradually along the length of out-coupler 54, as shown in FIG. 2. This sort of extended out-coupling is useful, for example, in expanding the pupil of an image formed by modulation of light source 22 and scanning of mirror 26, as explained above. Alternatively, rays 56 may be coupled out of waveguide 24 through face 30. Further alternatively, rays 48 may be coupled out of the waveguide as a narrow beam through either or both of faces 28 and 30 or through the far edge of the waveguide, opposite edge 32.

Figure 3:
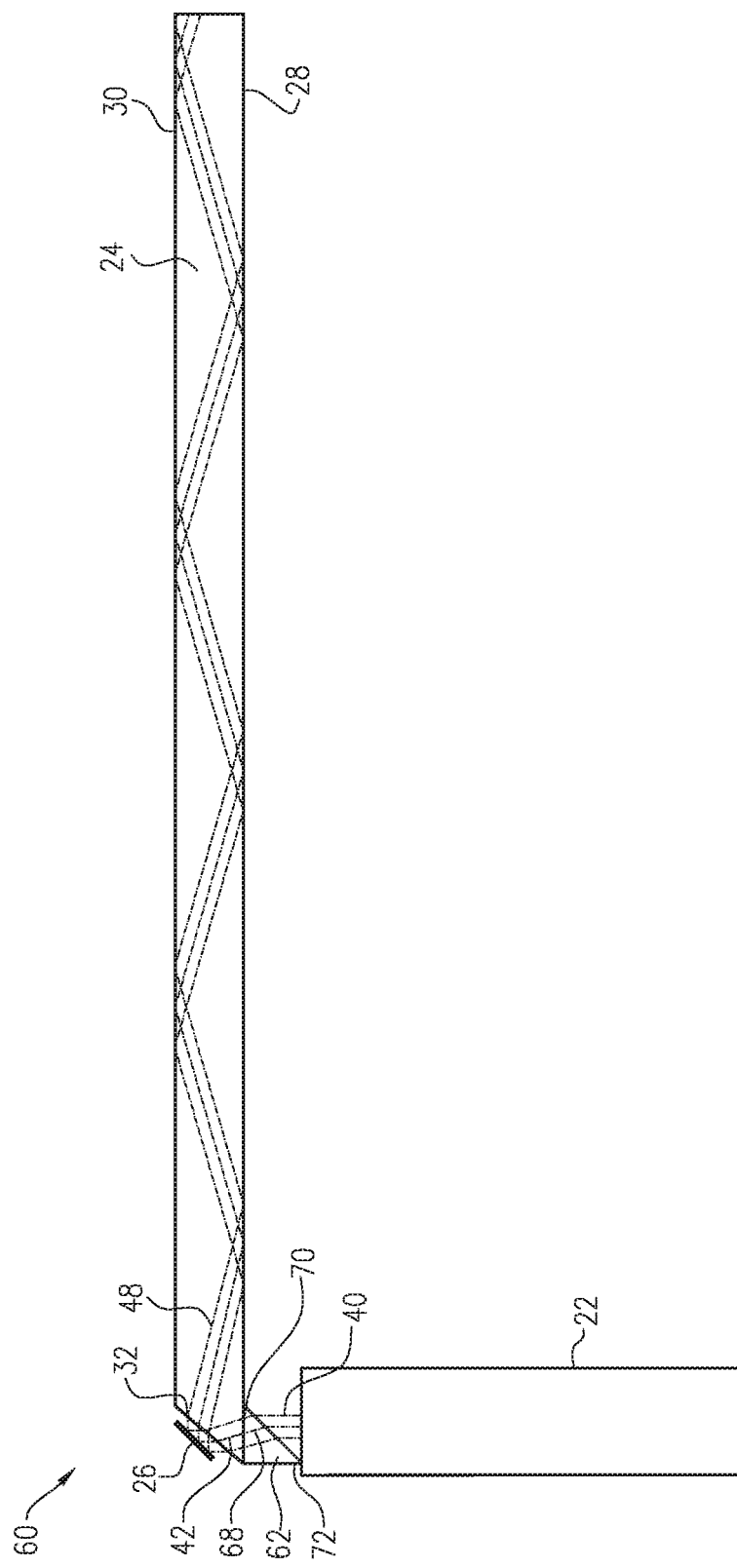
FIG. 3 is schematic sectional view of an optical apparatus, in accordance with yet another embodiment of the invention.

FIG. 3 is schematic sectional view of optical apparatus 60, in accordance with yet another embodiment of the invention.

Optical apparatus 60 is similar to optical apparatus 20, except that it comprises a prism 62, comprising an optically transparent material, with a first prism face 70 and a second prism face 72, wherein the first and second prism faces are not mutually parallel. Prism face 70 is in contact with or adjacent to first planar face 28, in proximity to edge 32. It is advantageous to have prism 62 comprise the same material (i.e., have the same refractive index n) as waveguide 24, as this minimizes losses due to Fresnel-reflections from the interface between first prism face 70 and first planar face 28. Alternatively, a difference $\Delta n$ in the refractive indices of waveguide 24 and prism 62 may be, for example, $\Delta n=0.1$, yielding a low reflectance at the interface, typically 0.1%.

Rays 40 emitted by source 22 impinge on prism face 72, and are refracted into rays 68, thus effectively turning rays 40 toward edge 32. When waveguide 24 and prism 62 comprise the same optical material, rays 68 continue through first prism face 70 unrefracted into rays 42. Alternatively, when the refractive indices differ by, for example $\Delta n=0.1$, the change in direction from rays 68 to rays 42 is typically less than 5°. Rays 42 continue, as in FIG. 1, to scanning mirror 26 and from there back into waveguide 24, propagating inside the waveguide by TIR as rays 48.

The use of prism 62 to turn rays 40 relaxes the requirements for positioning and orientation of source 22, thus relaxing the overall design constraints of optical apparatus 60.

Figure 4:
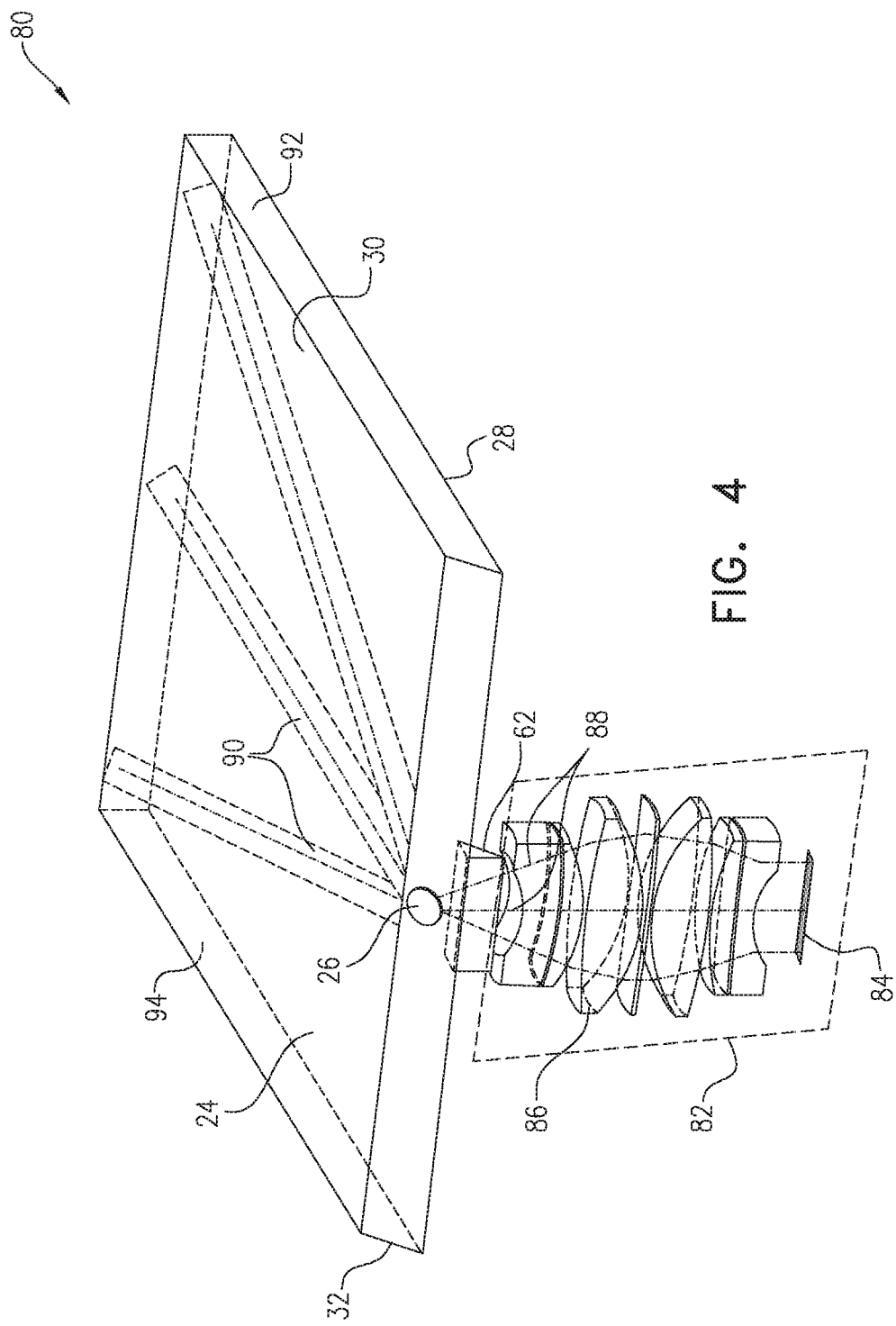
FIG. 4 is a schematic pictorial illustration of an optical apparatus, in accordance with a further embodiment of the invention.

FIG. 4 is a schematic pictorial illustration of an optical apparatus 80, in accordance with another embodiment of the invention.

Optical apparatus 80 is similar to optical apparatus 60, except that it comprises a wide-angle source of radiation 82. Wide-angle source 82 comprises an extended emitter 84, comprising, for example, an array of vertical-cavity surface-emitting lasers (VCSELs) or light-emitting diodes (LEDs). Wide-angle source 82 further comprises projection optics 86, which collect the light emitted by extended emitter 84 and project it toward waveguide 24 as rays 88 over a wide angular range, for example over ±45°.

Similarly to rays 40 in optical apparatus 60, rays 88 impinge on prism 62, and propagate further through first planar face 28 and edge 32 to scanning mirror 26 and back into waveguide 24, where the rays propagate by TIR as rays 90, corresponding to rays 48 in optical apparatus 60. Rays spread angularly in the plane of waveguide 24, corresponding to the angular spread of rays 88. Rays 90 may, for a sufficiently long distances of propagation (not shown in FIG. 4), impinge on a right and a left side-wall 92 and 94, respectively, of waveguide 24. As long as the angles of incidence of rays 90 on sidewalls 92 and 94 exceeds the critical angle, rays 90 are totally internally reflected back into waveguide 24. Otherwise rays 90 will partially refract out of waveguide 24 and partially reflect back into it.

Scanning Via the Planar Face of the Waveguide

Figure 5:
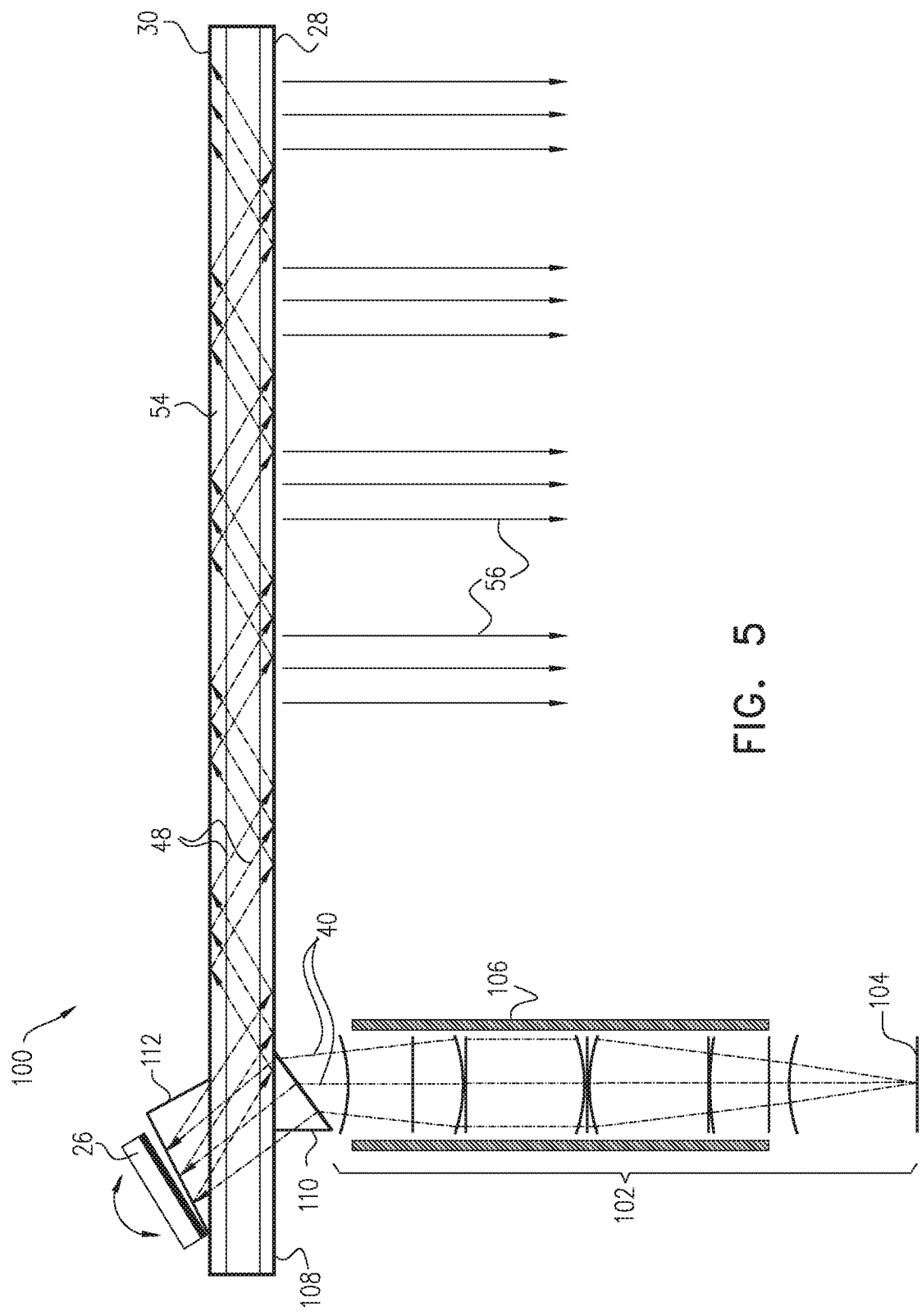
FIG. 5 is a schematic sectional view of an optical apparatus, in accordance with an alternative embodiment of the invention.

FIG. 5 is a schematic sectional view of an optical apparatus 100, in accordance with an alternative embodiment of the invention. Optical apparatus 100 comprises a radiation source 102 and a slab waveguide 108, which are largely similar in operation to the radiation sources and waveguides in the embodiments described above, except that the exit location through which the beam exits waveguide 108 toward scanning mirror 26 is in second planar face 30 of waveguide 108, rather than the edge.

Radiation source 102 comprises an extended emitter 104, comprising, for example, an array of VCSELs or LEDs, along with projection optics 106, which collect the light emitted by extended emitter 104 and project it toward waveguide 108. As in the embodiment of FIG. 3, a prism 110 is positioned between radiation source 102 and slab waveguide 108. Rays 40 of the beam from radiation source 102 enter prism 110 through an entrance face and exit from the prism through an exit face. Refraction by prism 110 causes the beam to enter waveguide 108 through first planar face 28 at an entrance location and entrance angle chosen so that the beam subsequently exits waveguide 108 at the desired exit location in face 30. Alternatively, radiation source 102 may itself be angled relative to waveguide 108 (as in the embodiments of FIGS. 1 and 2, for example), in which case prism 110 may not be required.

Apparatus 100 comprises an additional optically transparent prism 112, which comprises mutually non-parallel planar prism faces. Prism 112 is positioned with one of these faces in proximity to the exit location of the beam from second planar face 30 of waveguide 108 and the other face in proximity to scanning mirror 26. The beam exiting waveguide 108 at the exit location enters prism 112 through one face and exits the prism through the other face to impinge on scanning mirror 26. The scanning mirror reflects the beam back through prism 112, while rotating over a range of angles, so that the reflected, scanned beam exits prism 112 through the prism face that is in proximity to second planar face 30. This scanned beam reenters waveguide 108 through second planar face 30 at an angle exceeding the critical angle for TIR within the waveguide. Hence, rays 48 will propagate through waveguide 108 by TIR, as in the preceding embodiments, and will then be coupled out into rays 56 by out-coupler 54.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical apparatus, comprising:
    an optically transparent slab waveguide comprising first and second, mutually-parallel planar faces and a planar wedge-shaped edge, having a surface that is non-parallel and non-normal to the planar faces;
    a radiation source configured to direct a beam of optical radiation to enter the waveguide through the first planar face at an entrance location and entrance angle selected so that the beam subsequently exits the waveguide at an exit location in the surface of the wedge-shaped edge that is non-parallel and non-normal to the planar faces; and
    a scanning mirror positioned to receive the beam that has exited through the surface and to reflect the beam back through the surface into the waveguide while the scanning mirror rotates about an axis parallel to the surface over a range of angles selected so as to cause the beam, after reflection back into the waveguide through the surface, to propagate within the waveguide by total internal reflection (TIR) between the first and second planar faces.

2. The optical apparatus according to claim 1, wherein the beam exits the surface at a selected exit angle relative to the surface, and wherein the range of angles over which the scanning mirror rotates is selected so as to cause the beam reflected back from the scanning mirror to enter the surface and impinge on the first planar face at angles exceeding a critical angle for TIR within the waveguide.

3. The optical apparatus according to claim 1, and comprising an optically transparent prism comprising first and second, mutually non-parallel planar prism faces and positioned between the radiation source and the slab waveguide so that the beam from the radiation source enters the prism through the second prism face and exits from the prism through the first prism face so as to enter the waveguide through the first planar face at the entrance location and entrance angle such that the beam subsequently exits the waveguide at the exit location.

4. The optical apparatus according to claim 1, wherein the waveguide comprises an out-coupler configured to intercept the beam that propagates within the waveguide by total internal reflection and to couple the beam out of the waveguide.

5. The optical apparatus according to claim 4, wherein the scanning mirror rotates over a range of angles exceeding 50°.

6. The optical apparatus according to claim 1, wherein the scanning mirror is positioned in proximity to and parallel to the planar edge.

7. The optical apparatus according to claim 1,
    wherein the apparatus comprises an optically transparent prism, which comprises first and second, mutually non-parallel planar prism faces and is positioned with the first prism face in proximity to the second planar face of the waveguide and the second prism face, which defines the surface of the wedge-shaped edge through which the beam exits and enters the waveguide, in proximity to the scanning mirror.

8. The optical apparatus according to claim 7, wherein the prism is positioned so that the beam exiting the waveguide at the exit location enters the prism through the first prism face and exits the prism through the second prism face to impinge on the scanning mirror, which reflects the beam back through the second prism face so that the reflected beam exits the prism through the first prism face and reenters the waveguide through the second planar face at an angle exceeding a critical angle for TIR within the waveguide.

9. The optical apparatus according to claim 1, wherein the radiation source comprises an array of emitters and projection optics configured to collect the optical radiation from the emitters and to direct the optical radiation toward the entrance location.

10. A method for optical scanning, comprising:
    directing a beam of optical radiation to enter an optically transparent slab waveguide, which comprises first and second, mutually-parallel planar faces and a planar wedge-shaped edge, having a surface that is non-parallel and non-normal to the planar faces, through the first planar face at an entrance location and entrance angle selected so that the beam subsequently exits the waveguide at an exit location in the surface of the wedge-shaped edge that is non-parallel and non-normal to the planar faces;
    positioning a scanning mirror to receive the beam that has exited through the surface and to reflect the beam back through the surface into the waveguide; and
    rotating the scanning mirror about an axis parallel to the surface over a range of angles selected so as to cause the beam, after reflection back into the waveguide through the surface, to propagate within the waveguide by total internal reflection (TIR) between the first and second planar faces.

11. The method according to claim 10, wherein the beam exits the surface at a selected exit angle relative to the surface, and wherein the range of angles over which the scanning mirror rotates is selected so as to cause the beam reflected back from the scanning mirror to enter the surface and impinge on the first planar face at angles exceeding a critical angle for TIR within the waveguide.

12. The method according to claim 10, and comprising positioning an optically transparent prism, which comprises first and second, mutually non-parallel planar prism faces, between the radiation source and the slab waveguide so that the beam from the radiation source enters the prism through the second prism face and exits from the prism through the first prism face so as to enter the waveguide through the first planar face at the entrance location and entrance angle such that the beam subsequently exits the waveguide at the exit location.

13. The method according to claim 10, wherein the waveguide comprises an out-coupler configured to intercept the beam that propagates within the waveguide by total internal reflection and to couple the beam out of the waveguide.

14. The method according to claim 13, wherein the scanning mirror rotates over a range of angles exceeding 50°.

15. The method according to claim 10, wherein the scanning mirror is positioned in proximity to and parallel to the planar edge.

16. The method according to claim 10,
wherein the method comprises positioning an optically transparent prism, which comprises first and second, mutually non-parallel planar prism faces, with the first prism face in proximity to the second planar face of the waveguide and the second prism face, which defines the surface of the wedge-shaped edge through which the beam exits and enters the waveguide, in proximity to the scanning mirror.

17. The method according to claim 16, wherein the prism is positioned so that the beam exiting the waveguide at the exit location enters the prism through the first prism face and exits the prism through the second prism face to impinge on the scanning mirror, which reflects the beam back through the second prism face so that the reflected beam exits the prism through the first prism face and reenters the waveguide through the second planar face at an angle exceeding a critical angle for TIR within the waveguide.

18. The method according to claim 10, wherein directing the beam comprises collecting the optical radiation from an array of emitters and directing the optical radiation from the array toward the entrance location.

* * * * *